United States Patent
Takemori et al.

(10) Patent No.: US 10,748,425 B2
(45) Date of Patent: Aug. 18, 2020

(54) IMAGE GENERATION APPARATUS

(71) Applicant: DENSO CORPORATION, Kariya, Aichi-pref. (JP)

(72) Inventors: Daisuke Takemori, Kariya (JP); Takeshi Hatoh, Kariya (JP)

(73) Assignee: DENSO CORPORATION, Kariya, Aichi-Pref. (JP)

(*) Notice: Subject to any disclaimer, the term of this patent is extended or adjusted under 35 U.S.C. 154(b) by 236 days.

(21) Appl. No.: 15/558,407

(22) PCT Filed: Feb. 12, 2016

(86) PCT No.: PCT/JP2016/000720
§ 371 (c)(1),
(2) Date: Sep. 14, 2017

(87) PCT Pub. No.: WO2016/147547
PCT Pub. Date: Sep. 22, 2016

(65) Prior Publication Data
US 2018/0090007 A1    Mar. 29, 2018

(30) Foreign Application Priority Data
Mar. 16, 2015  (JP) ................................ 2015-052356

(51) Int. Cl.
*G08G 1/16* (2006.01)
*B60K 35/00* (2006.01)
(Continued)

(52) U.S. Cl.
CPC ............ *G08G 1/166* (2013.01); *B60K 35/00* (2013.01); *B60K 37/02* (2013.01); *B60K 37/06* (2013.01);
(Continued)

(58) Field of Classification Search
CPC ........ B60K 35/00; B60K 37/02; B60K 37/06; B60K 2350/1072; B60K 2350/1084;
(Continued)

(56) References Cited

U.S. PATENT DOCUMENTS 7,015,828 B2 * 3/2006 Ueminami et al. .... G08G 1/017
340/937
9,487,138 B2 * 11/2016 Waeller et al. .......... B60Q 1/00
(Continued)

FOREIGN PATENT DOCUMENTS

JP    H08-233594 A    9/1996
JP    H11-115660 A    4/1999
(Continued)

*Primary Examiner* — Jerrah Edwards
(74) *Attorney, Agent, or Firm* — Maschoff Brennan

(57) ABSTRACT

An image generation apparatus that generates an image notifying an occupant of a vehicle about a notification target located in a traveling direction of the vehicle, and outputs a virtual image of the image to a head-up display device that displays the virtual image while superimposing the virtual image on a foreground of the vehicle. The image generation apparatus includes: a target information acquisition part that obtains positional information and a moving direction of the notification target; an image generation part that generates a ripple image displayed by the head-up display device while superimposed on a road surface where the notification target is located when the target information acquisition part obtains at least one positional information; and a subject vehicle information acquisition part that obtains a traveling speed. The image generation part stops generation of the ripple image when the traveling speed exceeds a threshold speed specified beforehand.

28 Claims, 10 Drawing Sheets

(51) Int. Cl.
*B60K 37/02* (2006.01)
*B60K 37/06* (2006.01)
*G01S 13/86* (2006.01)
*B60Q 9/00* (2006.01)
*B60W 50/14* (2020.01)
*G06F 3/00* (2006.01)
*G08G 1/0962* (2006.01)
*G01S 13/931* (2020.01)
*G06K 9/00* (2006.01)
*G06F 3/03* (2006.01)
*G06F 3/01* (2006.01)
*G02B 27/01* (2006.01)

(52) U.S. Cl.
CPC ............ *B60Q 9/008* (2013.01); *B60W 50/14* (2013.01); *G01S 13/867* (2013.01); *G01S 13/931* (2013.01); *G06F 3/00* (2013.01); *G06F 3/011* (2013.01); *G06F 3/0304* (2013.01); *G06K 9/00671* (2013.01); *G06K 9/00791* (2013.01); *G08G 1/0962* (2013.01); *B60K 2370/155* (2019.05); *B60K 2370/179* (2019.05); *B60K 2370/1868* (2019.05); *B60K 2370/334* (2019.05); *B60K 2370/52* (2019.05); *G01S 2013/9323* (2020.01); *G01S 2013/9324* (2020.01); *G01S 2013/93271* (2020.01); *G02B 2027/014* (2013.01); *G02B 2027/0138* (2013.01); *G02B 2027/0141* (2013.01)

(58) Field of Classification Search
CPC ...... B60K 2350/2052; B60K 2350/352; B60K 2350/962; B60K 2370/155; B60K 2370/179; B60K 2370/1868; B60K 2370/334; B60K 2370/52; B60Q 9/008; B60W 50/14; G01S 13/867; G01S 13/931; G01S 2013/9364; G01S 2013/9367; G01S 2013/9375; G02B 2027/0138; G02B 2027/014; G02B 2027/0141; G06F 3/00; G06F 3/011; G06F 3/0304; G06K 9/00; G06K 9/00791; G08G 1/0962; G08G 1/166
See application file for complete search history.

(56) References Cited

U.S. PATENT DOCUMENTS

| | | | | |
|---|---|---|---|---|
| 9,690,104 | B2* | 6/2017 | Kim | G02B 27/01 |
| 9,965,956 | B2* | 5/2018 | Tsushima et al. | G08G 1/16 |
| 2004/0257443 | A1* | 12/2004 | Ueminami et al. | B60R 1/00 348/148 |
| 2014/0092134 | A1 | 4/2014 | Nagasawa et al. | |
| 2014/0240114 | A1* | 8/2014 | Waeller et al. | B60Q 9/00 340/435 |
| 2016/0163108 | A1* | 6/2016 | Kim | G06T 19/00 345/633 |
| 2017/0186319 | A1* | 6/2017 | Tsushima et al. | G08G 1/16 |

FOREIGN PATENT DOCUMENTS

| | | |
|---|---|---|
| JP | 2003-291688 A | 10/2003 |
| JP | 2007-87337 A | 4/2007 |
| JP | 2007-133644 A | 5/2007 |
| JP | 2010-176591 A | 8/2010 |
| JP | 2013-203103 A | 10/2013 |
| JP | 2014-213763 A | 11/2014 |

\* cited by examiner

IMAGE GENERATION APPARATUS

CROSS REFERENCE TO RELATED APPLICATIONS

The present application is based on Japanese Patent Application No. 2015-52356 filed on Mar. 16, 2015, the disclosure of which is incorporated herein by reference.

TECHNICAL FIELD

The present disclosure relates to a technology that uses an image to notify an occupant of a vehicle about a notification target located in a traveling direction of the vehicle.

BACKGROUND ART

There has been known a technology that uses a virtual image superimposed on a foreground of a vehicle to notify a driver about a presence of an obstacle such as a pedestrian. The virtual image is superimposed and displayed by a head-up display (HUD) device as described in Patent Literature 1, for example. According to Patent Literature 1, the visual line of the driver is guided toward the obstacle by visual line guide display that shifts an image toward the position of the obstacle.

PRIOR ART LITERATURES

Patent Literature

Patent Literature 1: JP 2003-291688 A

SUMMARY OF INVENTION

The display disclosed in Patent Literature 1 only indicates a current position of a notification target such as an obstacle. More specifically, the display does not suggest any hint of a future situation that the notification target enters an intended traveling course of the vehicle. In this case, the driver may not be aware of an impending crisis, and not recognize the notification target even when the visual line of the driver is directed to the notification target.

It is an object of the present disclosure to provide a technology that helps an occupant of a vehicle, such as a driver, more securely recognize a notification target.

According to one example of the present disclosure, an image generation apparatus generates an image notifying an occupant of a vehicle about a notification target located in a traveling direction of the vehicle, and outputs a virtual image of the image to a head-up display device that displays the virtual image while superimposing the virtual image on a foreground of the vehicle. The image generation apparatus includes: a target information acquisition part that obtains positional information and a moving direction of the notification target; and an image generation part that generates a ripple image displayed by the head-up display device while superimposed on a road surface where the notification target is located when the target information acquisition part obtains at least one positional information, the ripple image enlarged in the moving direction from the position of the notification target along the road surface.

The ripple image according to the present disclosure is shaped to expand in the moving direction of the notification target along the road surface to indicate a future shift position of the notification target. Accordingly, a part of the ripple image overlaps with an intended future traveling course of the vehicle. The occupant of the vehicle recognizes a future situation of an excessive adjacency between the notification target and the vehicle. It may be possible for the occupant viewing the ripple image to have a sense of impending crisis, and to securely recognize the notification target.

BRIEF DESCRIPTION OF DRAWINGS

The above and other aspects, features and advantages of the present disclosure will become more apparent from the following detailed description made with reference to the accompanying drawings. In the drawings.

DESCRIPTION OF EMBODIMENTS

Multiple embodiments according to the present disclosure are hereinafter described with reference to the drawings. Similar configuration elements in the respective embodiments have been given similar reference numbers. Repetitive description is omitted where appropriate. When only a part of a configuration in an embodiment is described, the remaining part of this configuration may be understood based on the corresponding part in other embodiments previously described. Even not expressly described, configurations of multiple embodiments may be partially combined as long as no particular problems are caused by the combination, in addition to an expressly described combination of configurations of the respective embodiments. It is intended that a combination of configurations described in the multiple embodiments and modified examples be included and disclosed in the following description even when the combination is not expressly indicated.

First Embodiment

Figure 1:
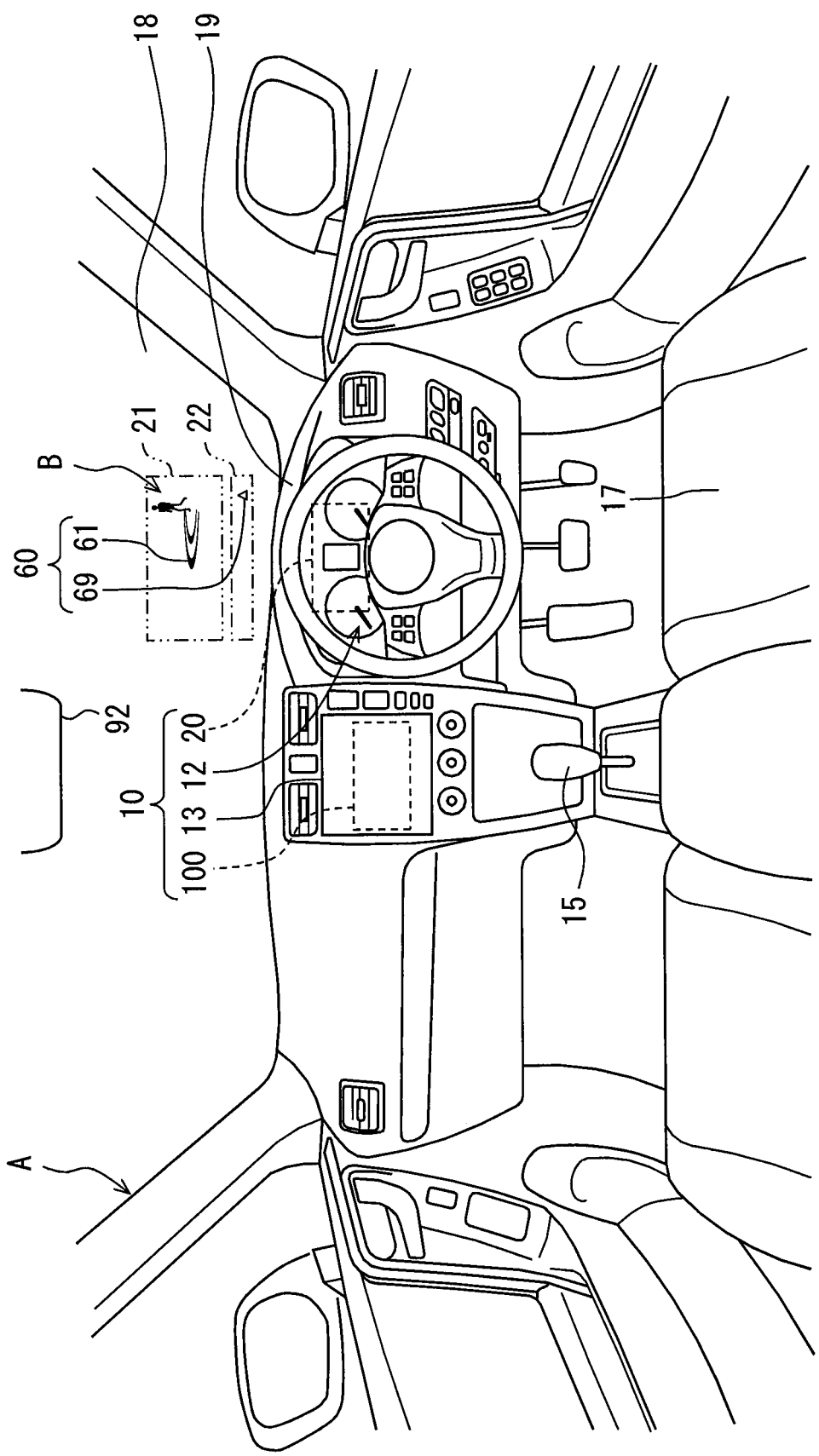
FIG. 1 is a view illustrating a layout around a driver seat in a vehicle.
Figure 2:
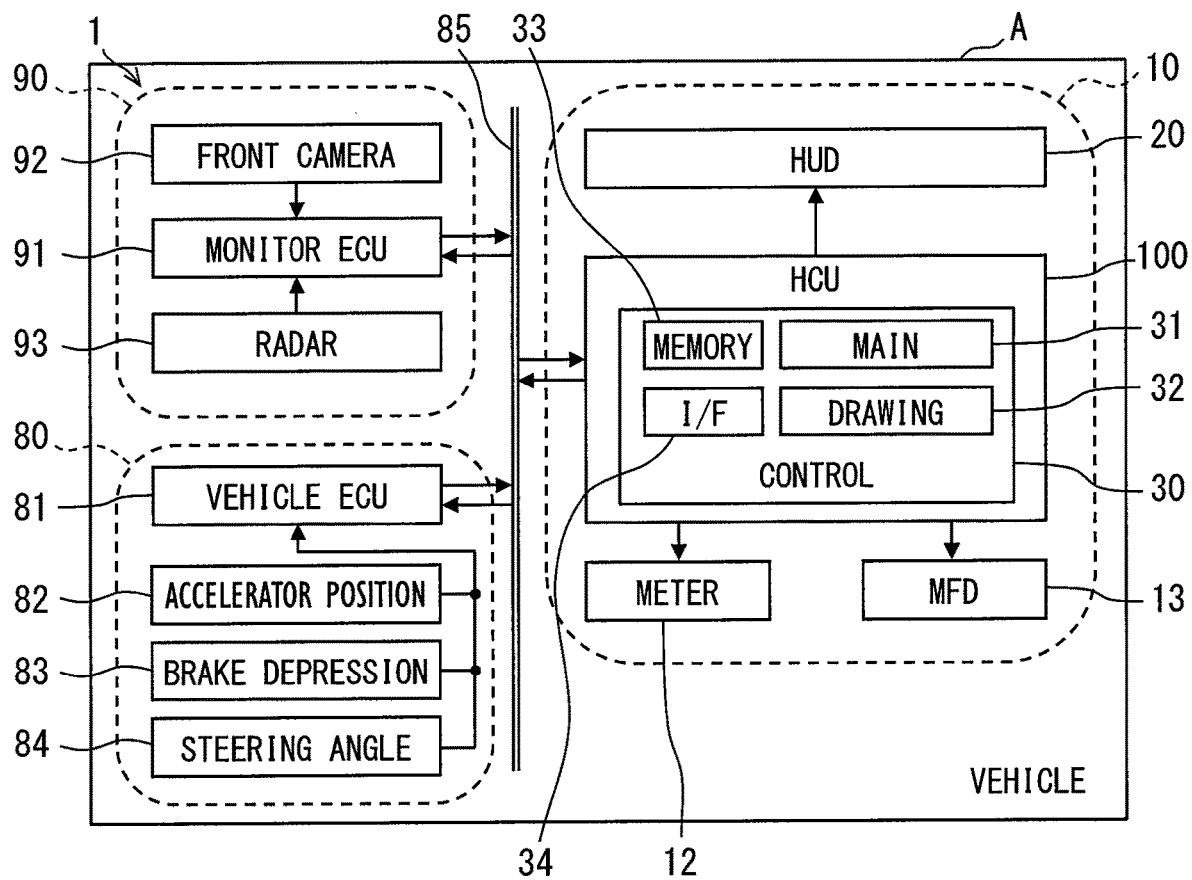
FIG. 2 is a block diagram showing a general configuration of a vehicle onboard network.

As illustrated in FIGS. 1 and 2, an HCU 100 according to a first embodiment of the present disclosure is an electronic device mounted on a vehicle A. The HCU 100 corresponds to one of multiple nodes provided in a vehicle onboard network 1. The vehicle onboard network 1 is configured by an outside recognition system 90, a vehicle control system 80, a display system 10, a communication bus 85 to which these systems are connected, and others. The HCU herein means a human machine interface control unit. This human machine interface is also called HMI. The vehicle A is also referred to as a subject vehicle.

The outside recognition system 90 includes outside sensors such as a front camera unit 92 and a radar unit 93, and further includes a periphery monitoring electronic control unit (ECU) 91. The outside recognition system 90 detects a moving object such as a pedestrian, an animal other than a human, a bicycle, a motorcycle, and other vehicles, and detects a still object such as a falling object on a road, a traffic signal, a guard rail, a curb, a road sign, a road marking, and a tree. The outside recognition system 90 may include an outside sensor such as light detection and ranging or laser imaging detection and ranging (LIDAR) and sound navigation ranging (SONAR), in addition to the units 92 and 93.

The front camera unit 92 is a monocular or compound-eye camera disposed in the vicinity of a back mirror of the vehicle A, for example. The front camera unit 92 faces in a traveling direction CD of the vehicle A (see FIG. 5), and is capable of imaging a range of approximately 80 meters from the vehicle A at a horizontal viewing angle of approximately 45 degrees, for example. The front camera unit 92 sequentially outputs data on images of a moving object and a still object to the periphery monitoring ECU 91.

Figure 5:
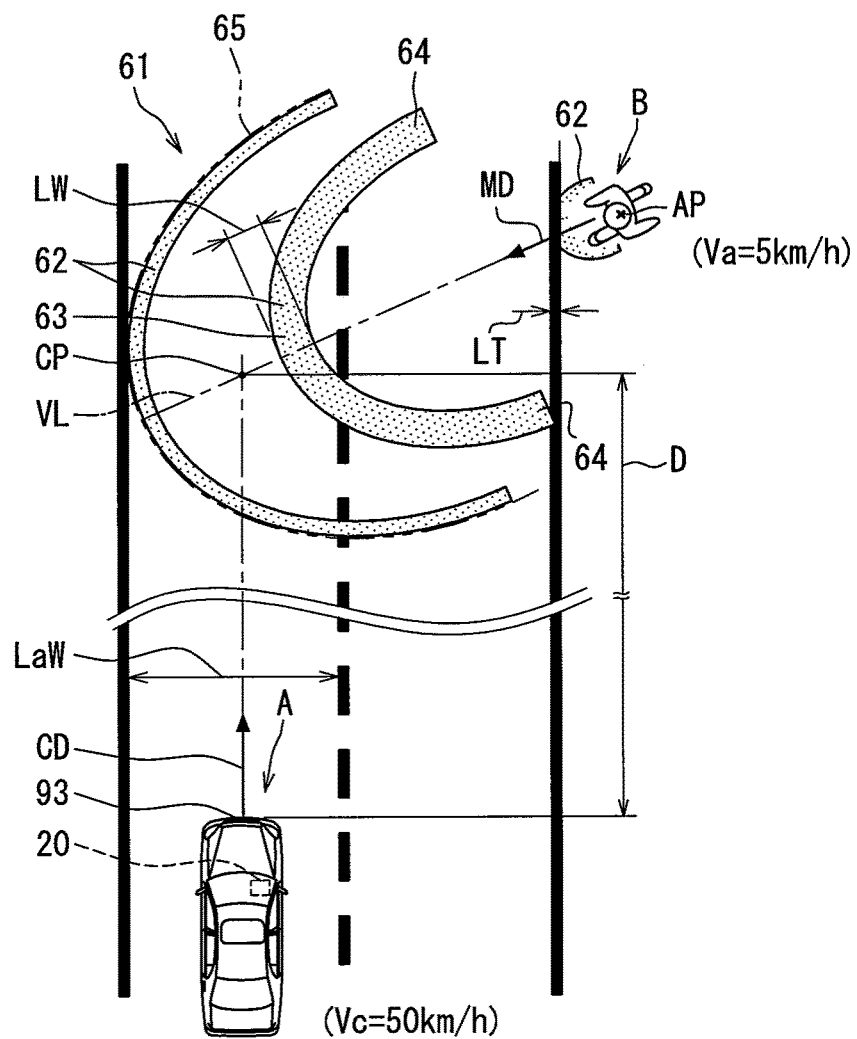
FIG. 5 is a view illustrating a concept of the ripple image shown in FIG. 4.

The radar unit 93 is disposed on a front region of the vehicle A, for example (see FIG. 5). The radar unit 93 emits millimeter waves in the band of 77 GHz in the traveling direction CD of the vehicle A (see FIG. 5) from a transmission antenna. The radar unit 93 receives, via a reception antenna, millimeter waves reflected on a moving object, a still object, and the like located in the traveling direction CD. The radar unit 93 is capable of scanning a range of approximately 60 meters from the vehicle A at a horizontal scanning angle of approximately 55 degrees, for example. The radar unit 93 sequentially outputs scanning information corresponding to reception signals to the periphery monitoring ECU 91.

The periphery monitoring ECU 91 is mainly configured by a microcomputer that includes a processor and a memory. The periphery monitoring ECU 91 is communicatively connected to the front camera unit 92 and the radar unit 93, and further to the communication bus 85. The periphery monitoring ECU 91 integrates information obtained from the units 92 and 93, and detects relative positions of the moving object and still object located in the traveling direction CD (see FIG. 5), based on the integrated information. More specifically, the periphery monitoring ECU 91 performs image processing to extract an object image contained in image data obtained by the front camera unit 92. The periphery monitoring ECU 91 subsequently calculates relative positions of the extracted moving object, still object, and the like (hereinafter referred to as detection objects), based on scanning information obtained by the radar unit 93. The periphery monitoring ECU 91 calculates a moving direction MD (see FIG. 5) and a moving speed Va (see FIG. 5) of each of the moving detection objects, based on a transition of the relative position. The periphery monitoring ECU 91 obtains a collision prediction time of each of the detection objects based on a traveling speed Vc (see FIG. 5) of the vehicle A obtained from the communication bus 85, and the calculated relative position of the detection object. The collision prediction time is also referred to as a time to collision (TTC).

The vehicle control system 80 includes operation detection sensors such as an accelerator position sensor 82, a brake depression sensor 83, and a steering angle sensor 84, and further includes a vehicle control ECU 81. The vehicle control system 80 controls traveling of the vehicle A, based on input from a vehicle occupant sitting on a driver seat 17 (hereinafter referred to as driver), and a detection result obtained by the external recognition system 90.

Each of the sensors 82 to 84 is connected to the vehicle control ECU 81. The accelerator position sensor 82 detects a depressing amount of an acceleration pedal depressed by the driver, and outputs a detection result to the vehicle control ECU 81. The brake depression sensor 83 detects a depressing amount of a brake pedal depressed by the driver, and outputs a detection result to the vehicle control ECU 81. The steering angle sensor 84 detects a steering amount steered by the driver, and outputs a detection result to the vehicle control ECU 81.

The vehicle control ECU 81 is mainly configured by a microcomputer that includes a processor and a memory. The vehicle control ECU 81 is connected to the communication bus 85. The vehicle control ECU 81 is configured by one or multiple types of ECUs. The vehicle control ECU 81 includes at least an integration control ECU, and further includes an engine control ECU, a motor control ECU, a brake control ECU, or others as necessary. The vehicle control ECU 81 outputs vehicle information such as detection results obtained by the respective sensors 82 to 84, and the traveling speed Vc of the vehicle A (see FIG. 5) to the communication bus 85. The vehicle control ECU 81 determines whether an emergency control condition has been met based on a collision prediction time obtained from the communication bus 85. When it is determined that the emergency control condition has been met, the vehicle control ECU 81 performs collision damage reduction braking to forcedly and automatically reduce the speed of the vehicle A. The collision damage reduction braking is also referred to as autonomous emergency braking (AEB).

The display system 10 includes display devices such as a head-up display (HUD) device 20, a combination meter 12, and a multifunction display 13, and further includes the HCU 100. The display system 10 provides information for the occupant of the vehicle A such as the driver. The display system 10 may include an operation device for operating display of each of the display devices.

Figure 3:
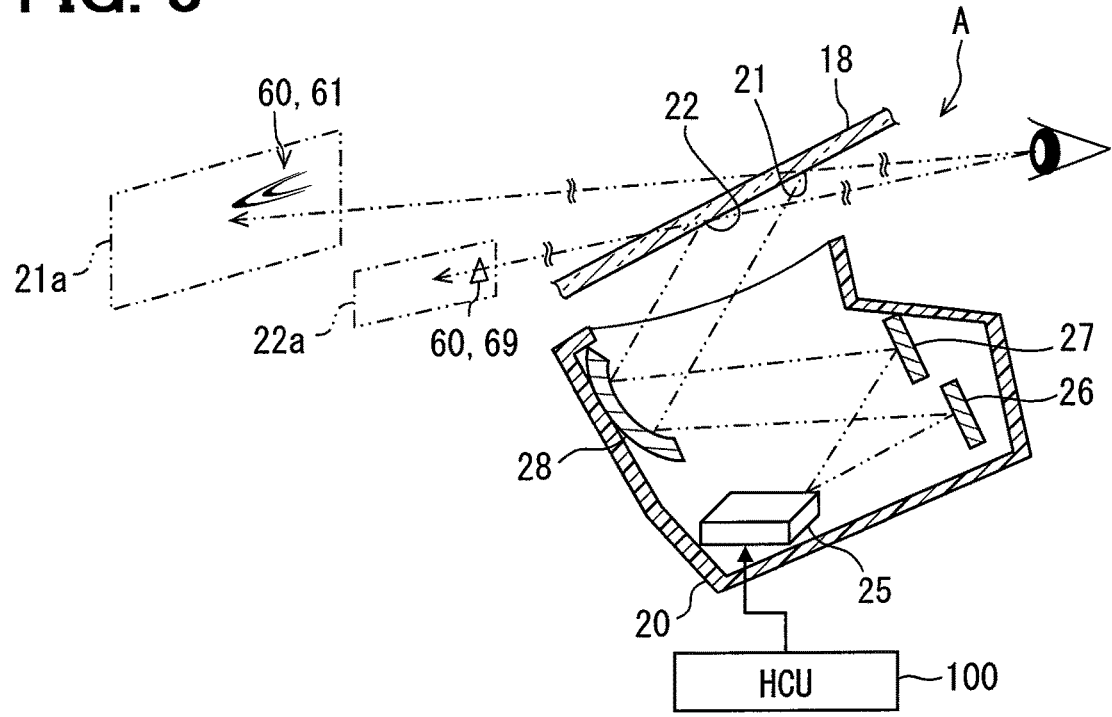
FIG. 3 is a view illustrating a configuration of an HUD device and a principle of virtual image display.

The HUD device 20 illustrated in FIGS. 1 and 3 is provided within an instrument panel 19 in an interior of the vehicle A. Light of an image corresponding to data obtained from the HCU 100 is projected on a windshield 18 by the HUD device 20. The light of the image reflected on the windshield 18 travels toward the interior of the vehicle to be viewed by the driver sitting on the driver seat 17. The driver visually recognizes a virtual image of the image projected by the HUD device 20 and superimposed on an outside scene (hereinafter referred to as foreground) in front of the vehicle A. The HUD device 20 includes a laser scanner 25, a first screen 26, a second screen 27, and a concave mirror 28 to realize this superimposed display on the foreground.

The laser scanner 25 emits laser beams to the respective screens 26 and 27. The laser scanner 25 emits laser beams for scanning based on image data obtained from the HCU 100. Each of the first screen 26, the second screen 27, and the concave mirror 28 is produced by depositing aluminum on a surface of a resin substrate or a glass substrate. An image is drawn on each of the first and second screens 26 and 27 by the laser scanner 25. Laser beams emitted from the laser scanner 25 are reflected on each of the screens 26 and 27, and travel toward the concave mirror 28 while diffused. The concave mirror 28 has a smooth curved shape whose center is recessed in a direction away from the respective screens 26 and 27. The concave mirror 28 enlarges the image on each of the screens 26 and 27, and projects the enlarged image on the windshield 18.

A far display area 21 and a near display area 22 are defined in the windshield 18 and disposed in a line in an up-down direction. The far display area 21 and the near display area 22 are areas on each of which an image is projected by the HUD device 20 configured as above. The far display area 21 is defined at a position substantially level with the eyes of the driver. Light of the image formed on the first screen 26 is projected on the far display area 21. The light projected on the far display area 21 is formed on a virtual first image generation surface 21a located before the windshield 18 by approximately 15 meters. The near display area 22 is defined below the far display area 21. The light of the image formed on the second screen 27 is projected on the near display area 22. The light projected on the near display area 22 is formed on a virtual second image generation surface 22a located before the windshield 18 by approximately 2 meters.

The HCU 100 outputs a control signal to each of the display devices such as the HUD device 20 shown in FIG. 2 to control display by each of the display devices. The HCU 100 includes a control circuit 30 that includes a main processor 31, an drawing processor 32, a rewritable non-volatile memory 33, an input/output interface 34 through which information is input and output, a bus connecting these units, and others.

Figure 4:
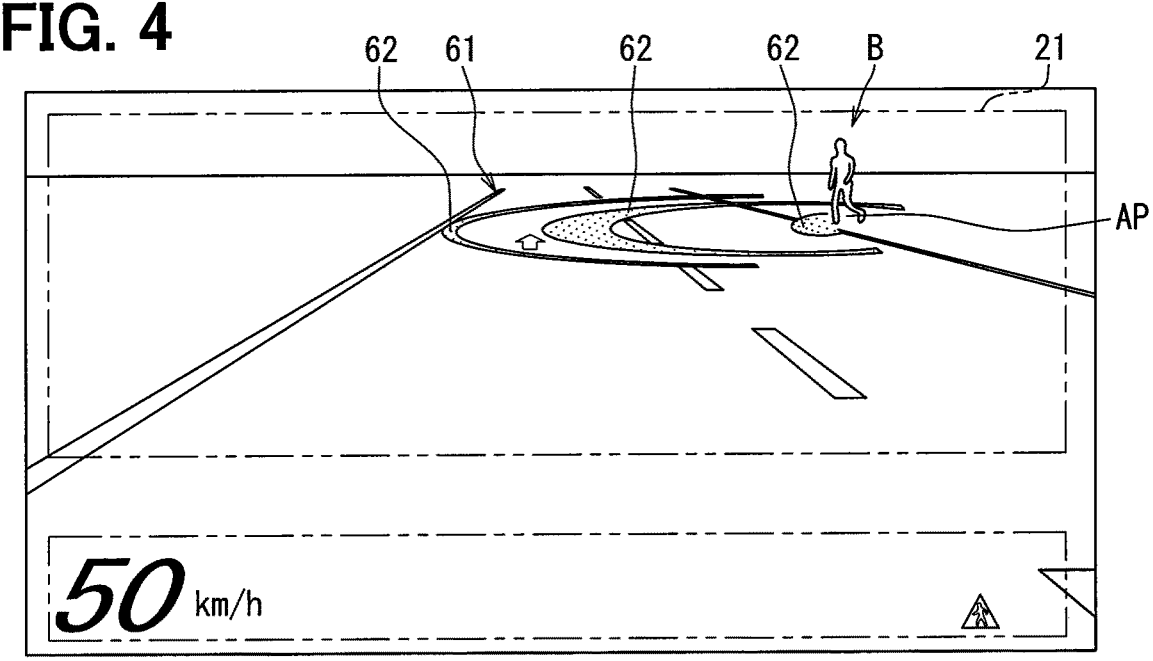
FIG. 4 is a view illustrating an example of a ripple image according to a first embodiment.

The display system 10 is capable of notifying the driver about a detection object such as a pedestrian detected by the outside recognition system 90 as a notification target B (see FIG. 4). Notification about the notification target B by the display system 10 is issued as a notification image 60 displayed as a virtual image by the HUD device 20 as illustrated in FIGS. 1 and 3. The notification image 60 includes a ripple image 61 projected on the far display area 21, and an icon 69 projected on the near display area 22. The notification image 60 is hereinafter detailed with reference to FIGS. 4 to 10. Note that an object corresponding to the notification target B of the display system 10 (see FIG. 2) is an object included in detection objects located in the traveling direction CD of the vehicle A and having the moving direction MD that crosses the traveling direction CD of the vehicle A.

As illustrated in FIG. 4, the HUD device 20 (see FIG. 3) displays the ripple image 61 while superimposing the ripple image 61 on a road surface on which the notification target B is located. The viewpoint of the ripple image 61 is converted such that a virtual mode illustrated in FIG. 5 is reproduced in the field of vision of the driver, and projected on the far display area 21 as illustrated in FIG. 4. Discussed concerning the ripple image 61 hereinbelow is mainly a shape of the ripple image 61 before conversion of the viewpoint. As illustrated in FIGS. 4 and 5, the ripple image 61 is an image extending in the moving direction MD of the notification target B from a position AP of the notification target B along the road surface. The ripple image 61 includes multiple arc image parts 62.

Each of the arc image parts 62 is curved in an elliptic arc shape surrounding the notification target B. The major axis of each of the arc image parts 62 substantially coincides with a virtual line VL extending in the moving direction MD of the notification target B from the position AP of the notification target B. The curvature of each of the arc image parts 62 increases in the direction from both ends 64 of the corresponding arc image part 62 toward the virtual line VL. A top portion 63 of each of the arc image parts 62 has the maximum curvature, and indicates the moving direction MD of the notification target B. A line width LW of each of the arc image parts 62 is set to a length wider than a line width LT of a section line formed on the road surface. The line width LW of each of the arc image parts 62 is set to a length smaller than the half of a lane width LaW (approximately 2.7 m to 3.5 m) of a lane along which the vehicle A travels. An interval between each adjoining pair of the arc image parts 62 on the virtual line VL is kept approximately the half of the lane width LaW.

The arc image parts 62 are repeatedly generated in the moving direction MD of the notification target B from the position AP of the notification target B. The color of the arc image part 62 superimposed in the vicinity of the position AP of the notification target B is given such gradation as to become lighter toward the position AP. Each of the arc image parts 62 becomes less clear toward the position AP of the notification target B, and becomes clearer in the direction away from the notification target B. Each of the arc image parts 62 shifts toward an outer edge 65 of the ripple image 61 while keeping a distance from the adjoining different arc image part 62 in the radial direction. Each of the arc image parts 62 enlarges in the radial direction with a shift toward the outer edge 65. Each of the arc image parts 62 sequentially stops formation in the direction from the outside to the inside when crossing the outer edge 65, and disappears by reducing the line width LW.

Figure 6:
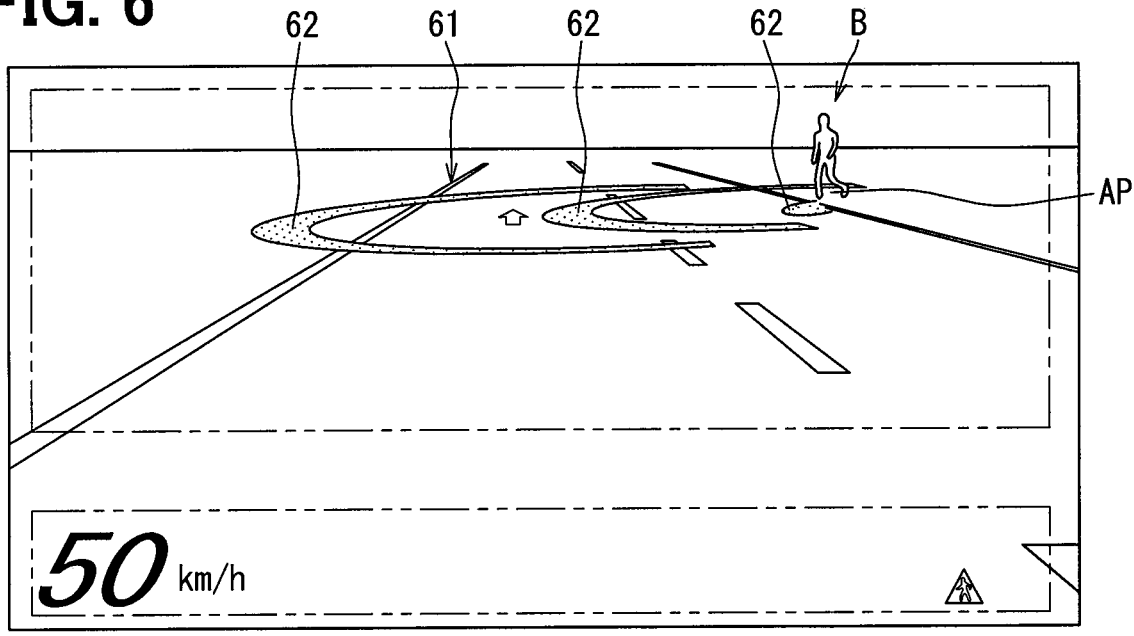
FIG. 6 is a view illustrating an example of a ripple image when a moving speed of a notification target changes.
Figure 7:
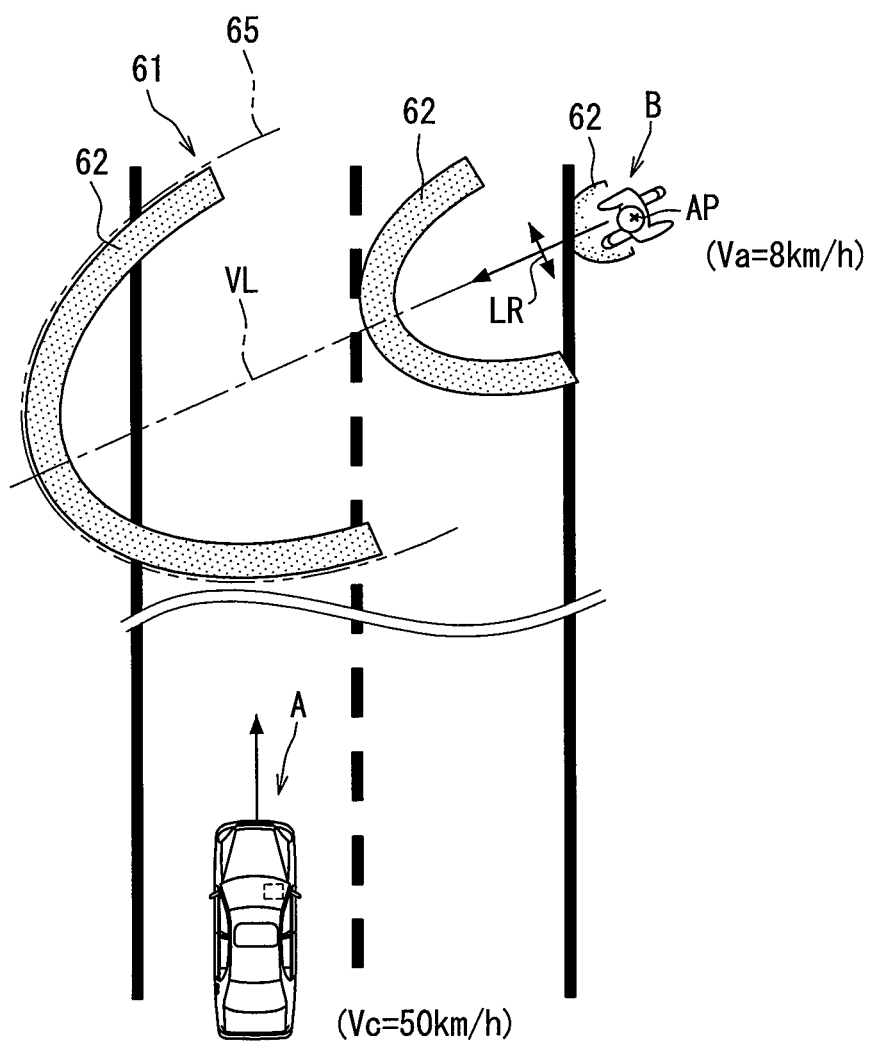
FIG. 7 is a view illustrating a concept of the ripple image shown in FIG. 6.

The mode of the ripple image 61 changes in accordance with respective statuses of the notification target B and the vehicle A. As illustrated in FIGS. 6 and 7, the ripple image 61 changes the position of the outer edge 65 in accordance with a moving speed Va of the notification target B. The outer edge 65 of the ripple image 61 is set to a position farther from the current position AP of the notification target B as the moving speed Va of the notification target B increases. Accordingly, display of the ripple image 61 becomes larger as the moving speed Va of the notification target B increases. The ripple image 61 thus configured indicates a range of reach of the notification target B after an elapse of a predetermined time (such as 3 seconds) by using the position of the outer edge 65.

The generation cycle of the arc image parts 62 of the ripple image 61 from the position AP of the notification target B shortens as the moving speed Va of the notification target B increases. Accordingly, a time interval between a shift start of one of the arc image part 62 and a shift start of the subsequent arc image part 62 becomes shorter. In addition, the shift speed of the arc image parts 62 increases as the moving speed Va of the notification target B increases. Furthermore, the size of the ripple image 61 decreases in the width direction LR perpendicular to the virtual line VL as the moving speed Va of the notification target B increases. In this case, each of the arc image parts 62 has an elliptic arc shape smaller in the minor axis direction.

Figure 8:
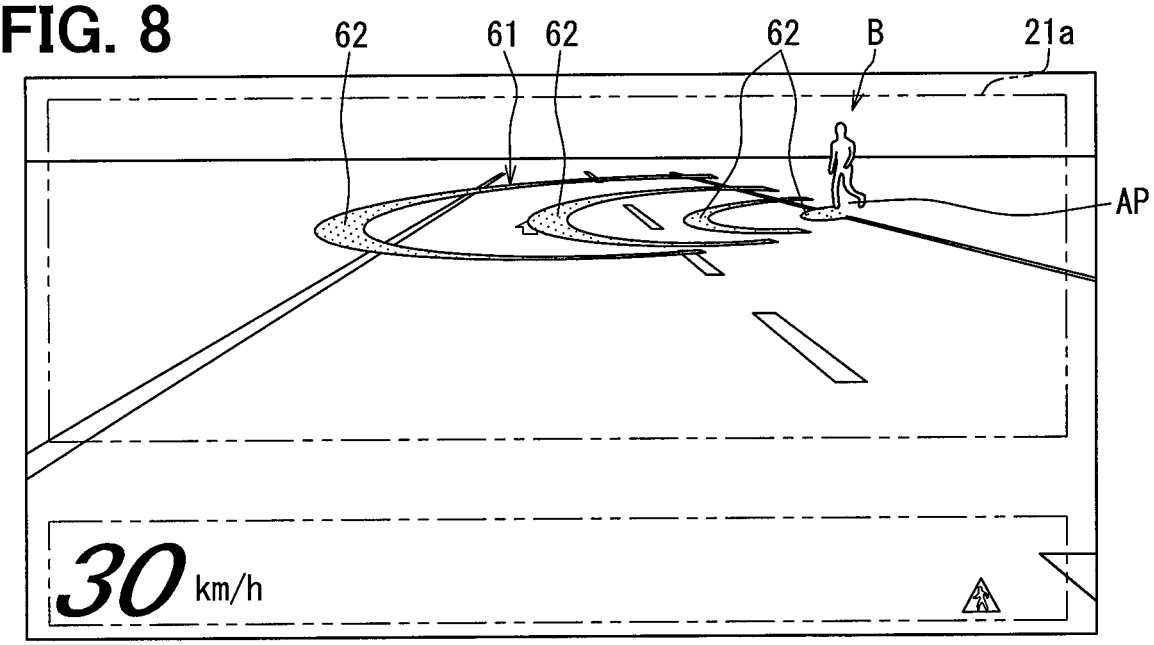
FIG. 8 is a view illustrating an example of a ripple image when a traveling speed of the vehicle changes.
Figure 9:
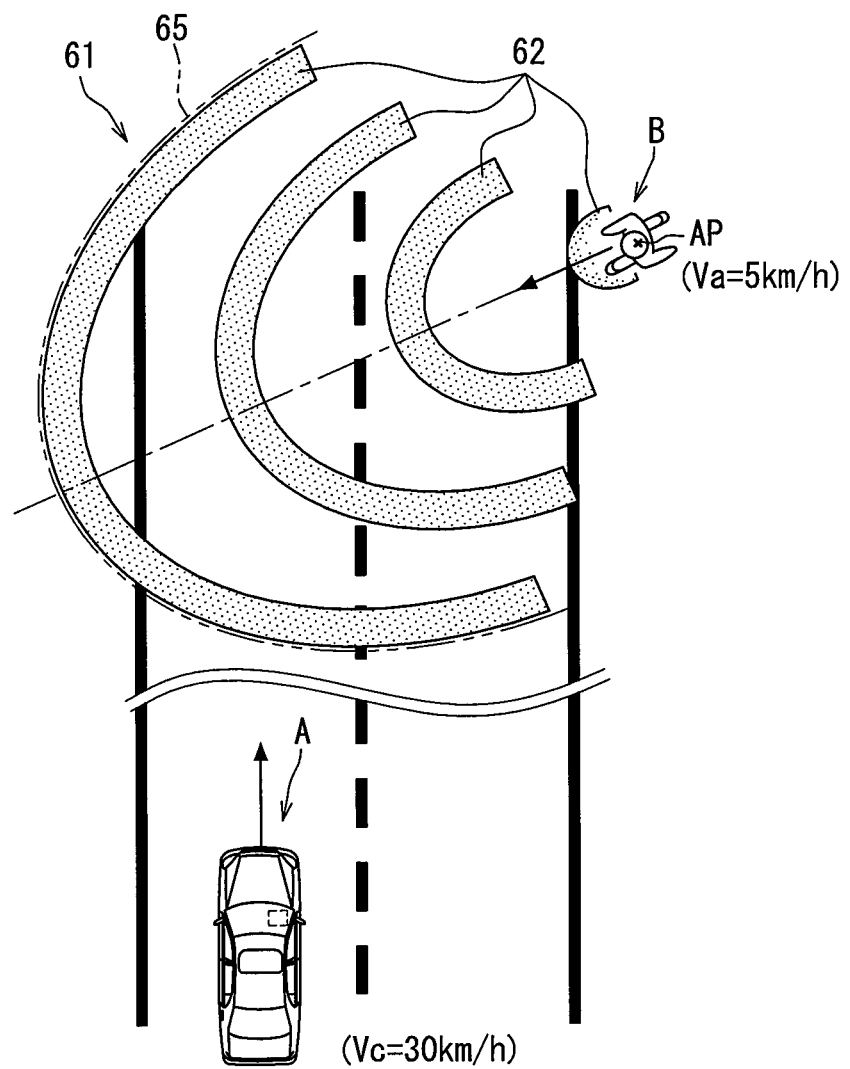
FIG. 9 is a view illustrating a concept of the ripple image shown in FIG. 8.

As illustrated in FIGS. 8 and 9, the ripple image 61 changes the position of the outer edge 65 in accordance with the traveling speed Vc of the vehicle A. The predetermined time set to specify the distance from the position AP of the notification target B to the outer edge 65 increases as the traveling speed Vc decreases. Accordingly, display of the ripple image 61 enlarges as the traveling speed Vc of the vehicle A decreases. In addition, the number of the arc image parts 62 included in the ripple image 61 may increase as the traveling speed Vc decreases.

Figure 10:
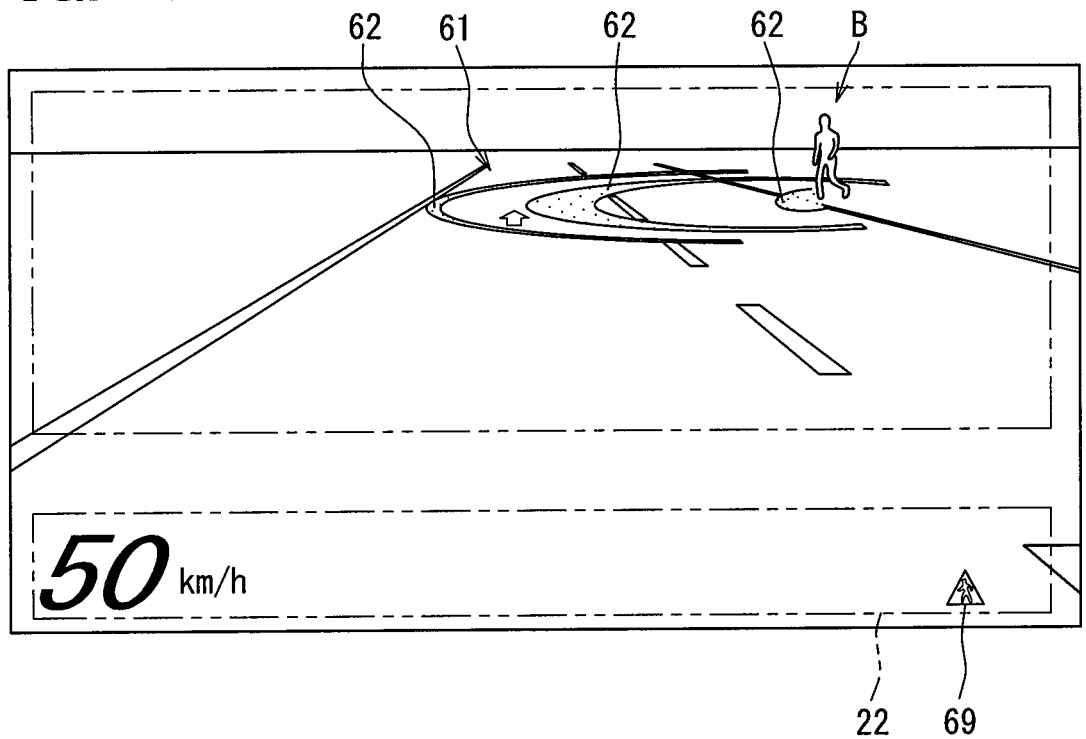
FIG. 10 is a view illustrating an example of a ripple image in a low visual attraction mode.

The ripple image 61 is formed for the notification target B only when it is determined that the moving direction MD of the notification target B crosses the traveling direction CD. In addition, when an avoiding operation for avoiding the notification target B is input from the driver, the mode of the ripple image 61 is switched to a mode of low visual attraction (referred to as low attraction mode) as illustrated in FIG. 10. In the low attraction mode, each of the arc image parts 62 is displayed with lower luminance than that of the arc image parts 62 in the normal mode (FIG. 4), and in an inconspicuous color.

The notification target B is located farther from the vehicle A at a start of display of the ripple image 61 as the traveling speed Vc of the vehicle A illustrated in FIG. 5 increases. Display of the ripple image 61 starts based on a state that a distance D from the vehicle to a virtual cross position CP becomes shorter than a threshold distance. The cross position CP is a position where the traveling direction CD of the vehicle A and the moving direction MD of the notification target B cross each other. The threshold distance is set to a braking distance sufficient for stopping the vehicle A at a deceleration of 0.2 G, for example. When the distance D to the cross position CP becomes shorter than a braking distance sufficient for stopping the vehicle A at a deceleration of 0.4 G, the display system 10 (see FIG. 2) gives notification in voices in addition to notification by the ripple image 61. When the distance D to the cross position CP becomes shorter than a braking distance sufficient for stopping the vehicle A at a deceleration of 0.8 G, automatic deceleration by AEB starts based on a state that the emergency control condition has been met. A display color of the ripple image 61 may be sequentially changed in an order of yellow, amber, and red, for example, as the vehicle A approaches the cross position CP. In addition, display of the ripple image 61 may be blinked with an approach of the vehicle A to the cross position CP.

As illustrated in FIG. 10, the icon 69 is projected on the near display area 22. Display of the icon 69 starts after an elapse of a predetermined time (such as about 1 second) from a start of display of the ripple image 61. Similarly to the ripple image 61, the icon 69 is an image based on which the driver recognizes the presence of the notification target B. The icon 69 is displayed in a color substantially identical to the color of the arc image parts 62.

Figure 11:
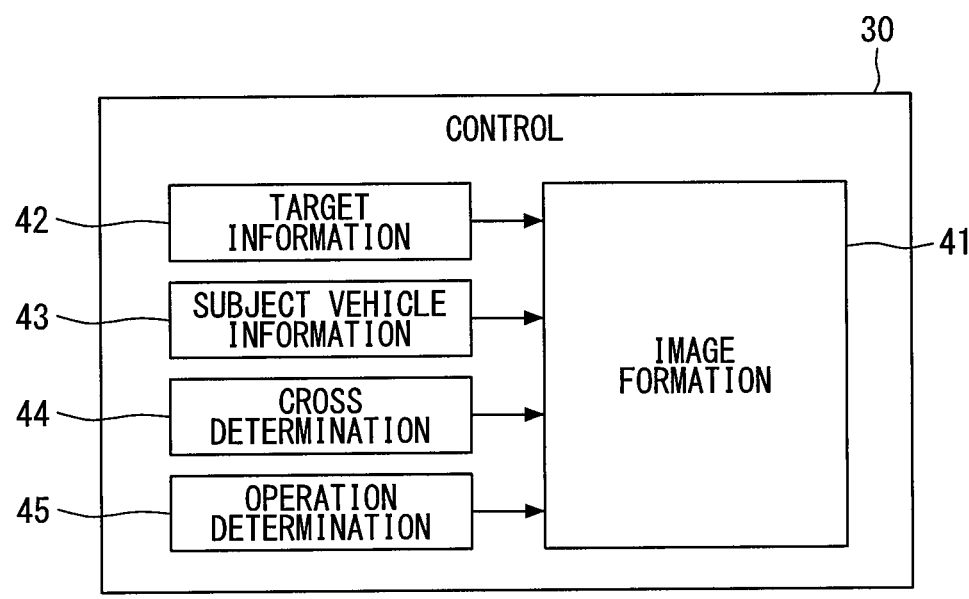
FIG. 11 is a diagram showing a function block configured in a control circuit.

For displaying the ripple image 61 and the icon 69 described above, the control circuit 30 illustrated in FIGS. 2 and 11 configures multiple function blocks 41 to 45 under notification programs stored in the memory 33 and executed by the respective processors 31 and 32. The function blocks are hereinafter described with reference to FIG. 11 in conjunction with FIGS. 2 and 5.

The image generation part 41 is a function block that generates image data on the ripple image 61 and the icon 69 (see FIG. 10). The image generation part 41 determines display modes of the ripple image 61 and the icon 69, based on information obtained by the function blocks 42 to 45. The image generation part 41 generates image data on the ripple image 61 and the icon 69 in the determined mode, and outputs the generated image data to the HUD device 20.

The target information acquisition part 42 is a function block that obtains positional information, the moving direction MD, and the moving speed Va of the notification target B and other detection objects output from the outside recognition system 90 to the communication bus 85. The subject vehicle information acquisition part 43 is a function block that obtains the traveling speed Vc of the vehicle A and other information output from the vehicle control system 80 to the communication bus 85.

The cross determination part 44 is a function block that selects an object corresponding to the notification target B from the detection objects detected by the outside recognition system 90. The cross determination part 44 determines whether the moving direction MD of each of the detection objects obtained by the target information acquisition part 42 crosses the traveling direction CD of the vehicle A. The cross determination part 44 determines the detection object as the notification target B when determining that the moving direction MD of the detection target and the traveling direction CD cross each other.

The operation determination part 45 is a function block that determines whether an avoiding operation for avoiding the notification target B has been input from the driver. The operation determination part 45 obtains operation information output from the vehicle control system 80 to the communication bus 85. The operation determination part 45 determines the presence or absence of the avoiding operation for avoiding the notification target B, based on the obtained operation information. The avoiding operation includes an operation for turning the steering to the side opposite to the notification target B, an operation for reducing depression of the accelerator, an operation for generating deceleration by braking, and others.

Figure 12:
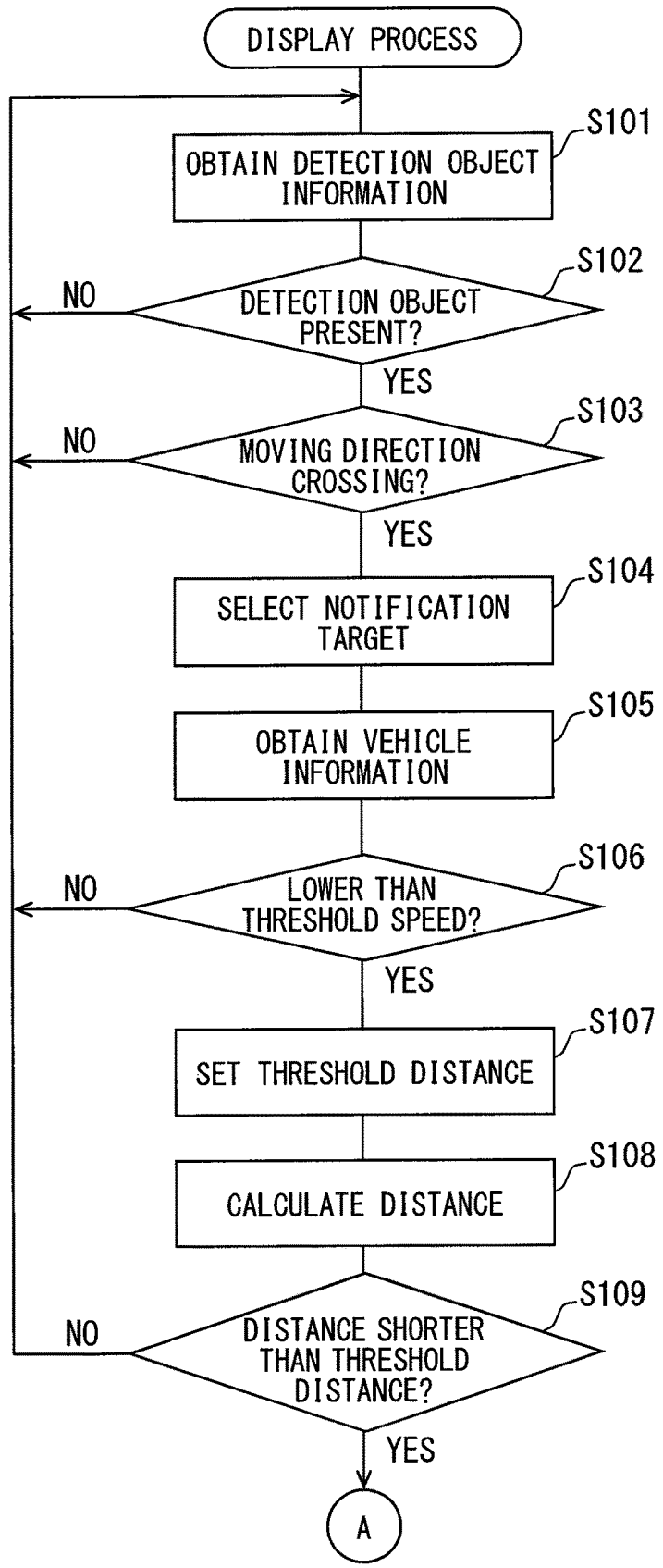
FIG. 12 is a flowchart showing a process executed by the control circuit.
Figure 13:
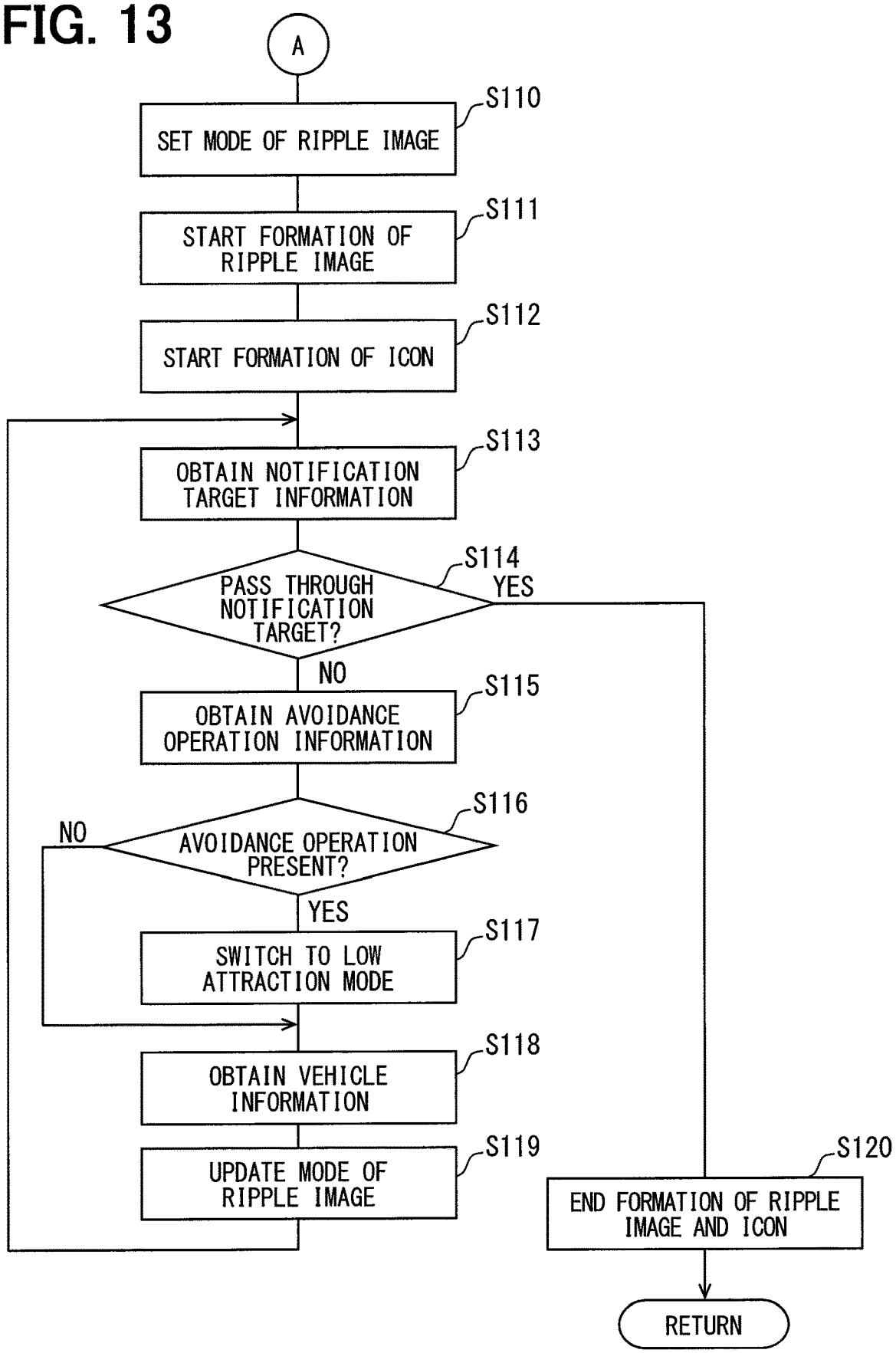
FIG. 13 is a flowchart showing the process executed by the control circuit.

A display process for displaying the ripple image 61 and the icon 69 executed by the control circuit 30 is now detailed with reference to FIGS. 12 and 13 in conjunction with FIG. 5. The process shown in flowcharts of FIGS. 12 and 13 is repeatedly executed by the control circuit 30 (see FIG. 2) in response to a change of the status of the vehicle A to a traveling status by switching to a D range of a selector lever 15 (see FIG. 1).

In S101, information on a detection object, such as the relative position, the moving direction MD, and the moving speed Va of the detection object, is obtained from the communication bus 85 (see FIG. 2). Thereafter, the flow proceeds to S102. In S102, the presence or absence of the detection object is determined based on determination of whether information on the detection object has been obtained in S101. When it is determined that the detection object is absent in S102, the flow returns to S101. When it is determined that the detection object is present in S102, the flow proceeds to S103.

In S103, it is determined whether the moving direction MD of the detection object crosses the traveling direction CD of the vehicle A. When there exist multiple sets of information obtained for multiple detection objects, crossing between the moving direction MD and the traveling direction CD is determined for each of the detection objects. When it is determined that the moving direction MD of the detection object does not cross the traveling direction CD in S103, the flow returns to S101. When it is determined that the detection object whose moving direction MD crosses the traveling direction CD is present in S103, the flow proceeds to S104.

In S104, a detection object is selected from the detection objects and determined as the notification target B, and then the flow proceeds to S105. When there exist multiple sets of position information obtained for multiple notification targets B located at a distance shorter than a predetermined distance (such as approximately 3 meters) from each other, one notification target B located closest to the vehicle is selected from the multiple notification targets B in S104. In S105, information on the vehicle A such as the traveling speed Vc is obtained from the communication bus 85 (see FIG. 2), and then the flow proceeds to S106.

In S106, it is determined whether the traveling speed Vc obtained in S105 is lower than a threshold speed (such as 60 km/h). When it is determined that the traveling speed Vc is the threshold speed or higher in S106, the flow returns to S101. When it is determined that the traveling speed Vc is lower than the threshold speed in S106, the flow proceeds to S107.

In S107, a threshold distance for specifying a display start of the ripple image 61 is set based on the traveling speed Vc obtained in S105, and then the flow proceeds to S108. In S108, the distance D between the vehicle A and the cross position CP is calculated based on the positional information on the notification target B obtained in S101, and then the flow proceeds to S109. In S109, the threshold distance set in S107 and the distance D calculated in S108 are compared to determine whether the distance D is shorter than the threshold distance. When it is determined the relative distance is the threshold distance or longer in S109, processing from S101 to S108 is repeated until the distance D becomes shorter than the threshold distance. The flow proceeds to S110 when it is determined that the distance D has become shorter than the threshold distance in S109.

In S110, a mode of the ripple image 61 is set based on the information on the notification target B obtained in S101, and the information on the vehicle A obtained in S105, and then the flow proceeds to S111. In S110, settings of the projection position and size of the ripple image 61, the generation direction and generation cycle of the arc image parts 62, and the low attraction mode or other modes are determined, for example.

In S111, generation of the ripple image 61 starts, and then the flow proceeds to S112. In S112, generation of the icon 69 (see FIG. 10) starts, and then the flow proceeds to S113. Image data on each of the ripple image 61 and the icon 69 having started generation in S111 and S112 is sequentially output to the HUD device 20. In S113, information on the notification target B is obtained by processing substantially similar to processing in S101, and then the flow proceeds to S114. In S114, it is determined whether the vehicle A has passed through the side of the notification target B based on the information on the relative position of the notification target B obtained in S113. When it is determined that the vehicle A has passed through the notification target B in S114, the flow proceeds to S120.

When it is determined that the vehicle A has not passed through the notification target B yet in S114, information on an avoiding operation performed by the driver is obtained in S115. Thereafter, the flow proceeds to S116. In S116, it is determined whether the avoiding operation is present based on the information obtained in S115. When it is determined that the avoiding operation is absent in S116, the flow proceeds to S118. When it is determined that the avoiding operation is present in S116, the flow proceeds to S117. In S117, the mode of the ripple image 61 is switched from the normal mode to the low attraction mode, and then the flow proceeds to S118.

In S118, information on the vehicle A is obtained by processing substantially similar to processing in S105, and then the flow proceeds to S119. In S119, the mode of the ripple image 61 is updated based on the information on the notification target B obtained in S113 and the information on the vehicle A obtained in S118, and then the flow returns to S113. In S119, the display position, size, color, and the like of the ripple image 61 are changed. In addition, switching to the low attraction mode is reflected in the ripple image 61 in S119.

When it is determined that the vehicle A has passed through the notification target B in S114, generation of the ripple image 61 and the icon 69 ends in S120. Thereafter, the flow returns to S101. In S120, display of the ripple image 61 and the icon 69 is stopped substantially at the same time.

The ripple image 61 according to the first embodiment discussed above is capable of indicating a future position of the notification target B by a shape of the ripple image 61 enlarged in the moving direction MD of the notification target B along the road surface. Accordingly, a part of the ripple image 61 overlaps with an intended traveling course of the vehicle A. In this case, the driver is given a hint of a future situation of an excessive adjacency between the notification target B and the vehicle A. The driver therefore has a sense of impending crisis based on the ripple image 61, and more securely recognizes the presence of the notification target B.

In the first embodiment, the ripple image 61 that enlarges in the moving direction MD in accordance with the moving speed Va of the notification target B can accurately indicate a range that may include the future position of the notification target B. Therefore, it may be possible for the occupant viewing the ripple image 61 to be given a keen sense of impending crisis for the notification target B moving at the high moving speed Va, and to recognize the presence of the notification target B.

Moreover, the ripple image 61 according to the first embodiment has such a display mode in which the arc image parts 62 repeatedly generated from the position AP of the notification target B shifts toward the outer edge 65. In this case, the ripple image 61 does not continuously cover the same range of the road surface. The ripple image 61 thus configured prevents such a situation that recognition of a falling object on the road surface, a traffic sign and the like is difficult for the driver.

Furthermore, the ripple image 61 according to the first embodiment shortens the generation cycle of the arc image parts 62 in accordance with the moving speed Va of the notification target B. In this case, the ripple image 61 gives the driver a keen sense of impending crisis for the notification target B moving at high speed. Accordingly, the driver viewing the ripple image 61 more securely recognizes the presence of the notification target B that moves at higher speed than a pedestrian and therefore needs special attention, such as a person on a bicycle.

Note that the moving direction MD is more difficult to change as the moving speed Va of the notification target B becomes higher. Accordingly, in the first embodiment, the length of each of the arc image parts 62 in the width direction LR is reduced in accordance with the moving speed Va of the notification target B. Thus, the ripple image 61 indicates a range that may include a future position of the notification target B without deficiency and excess. The driver viewing the ripple image 61 is therefore allowed to recognize the presence of the notification target B without an excessive sense of impending crisis.

Furthermore, the arc image parts 62 of the ripple image 61 according to the first embodiment are shaped to increase curvature in the direction toward the top portion 63 crossing the virtual line VL to indicate the moving direction MD of the notification target B. Accordingly, the driver having viewed the ripple image 61 easily estimates an approach of the notification target B to the vehicle A, and has a sense of impending crisis.

Furthermore, according to the first embodiment, notification by superimposed display of the ripple image 61 is issued only for the notification target B whose moving direction MD crosses the traveling direction CD of the vehicle A. This configuration reduces notification issued to the driver about the notification target B corresponding to a detection object that does not have the moving direction MD crossing the traveling direction CD and therefore does not approach the vehicle A. Accordingly, the display system 10 reduces bothersome notification to the driver while allowing the driver to more securely recognize the presence of the notification target B.

Furthermore, the mode of the ripple image 61 according to the first embodiment is switched to the low attraction mode in accordance with input of an avoiding operation for avoiding the notification target B. When visual attraction by the ripple image 61 is lowered in this manner, the driver having performed the avoiding operation does not feel bothersome by continuous notification about the notification target B. In addition, the ripple image 61 is configured not to completely disappear to avoid such misunderstanding by the driver that the notification target B has been already eliminated.

The range of movement of the notification target B within a predetermined time becomes narrower as the traveling speed Vc increases. Accordingly, the ripple image 61 that narrows in accordance with increase in the traveling speed Vc of the vehicle A according to the first embodiment indicates the range possibly including a future position of the notification target B without deficiency and excess. The driver is therefore allowed to recognize the presence of the notification target B without an excessive sense of impending crisis by a change of the mode of the ripple image 61 based on the traveling speed Vc.

According to the first embodiment, the distance between the vehicle A and the notification target B for which superimposition of the ripple image 61 starts to display becomes longer as the traveling speed Vc of the vehicle A increases. In this case, a remaining time until an approach of the vehicle A to the notification target B is secured even when the traveling speed Vc of the vehicle A becomes higher. Accordingly, the driver recognizes the notification target B in a calm manner.

Furthermore, according to the first embodiment, generation of the ripple image 61 is stopped with an excess of a threshold speed specified beforehand. In a practical situation, neither pedestrian nor bicycle exists as the notification target B on a highway for high-speed traveling. In this case, no notification by the ripple image 61 is necessary. In addition, the driver may be confused when notification is issued in such timing that the driver is difficult to perform an avoiding operation in time. It is therefore preferable that notification by the ripple image 61 is issued only at a speed of the threshold speed or lower.

According to the first embodiment, notification by the ripple image 61 is issued for one notification target B closest to the vehicle A in multiple notification targets B located at a shorter distance from each other than a predetermined distance. This manner of notification allows the driver to collectively recognize the multiple notification targets B. In addition, this manner of notification reduces unclear indication of the position of the notification target B that should be recognized even when the multiple ripple images 61 overlap with each other.

Furthermore, deviation may be inevitably produced in information on the position of the notification target B detected by the outside recognition system 90 because of processing delay and detection errors, for example. Accordingly, according to the first embodiment, the ripple image 61 in the vicinity of the notification target B is made unclear so that the driver does not easily recognize positional deviation between the notification target B and the ripple image 61. This configuration therefore reduces a sense of incongruity produced by positional deviation of the ripple image 61 and preventing rapid recognition of the notification target B by the driver.

Furthermore, the ripple image 61 according to the first embodiment is displayed prior to the icon 69. In this case, the visual line of the driver is initially guided to the notification target B rather than the icon 69. When the display start of the icon 69 is delayed as in this manner, the visual line of the driver is not initially guided to the icon 69. Accordingly, a delay of recognition of the notification target B is avoidable.

Furthermore, when each of the arc image parts 62 is displayed with the line width LW larger than the width of a white line on the road surface as in the first embodiment, the arc image parts 62 are not easily overlooked by the driver. In addition, the arc image parts 62 each of which is indicated with the line width LW smaller than the half length of the lane width LaW does not easily cover a falling object on the road surface, a traffic sign, and the like. It is therefore preferable that the line width LW of each of the arc image parts 62 lies in the range designated above for the above-described reason. Note that the HCU 100 according to the first embodiment corresponds to an image generation apparatus of the present disclosure.

Second Embodiment

Figure 14:
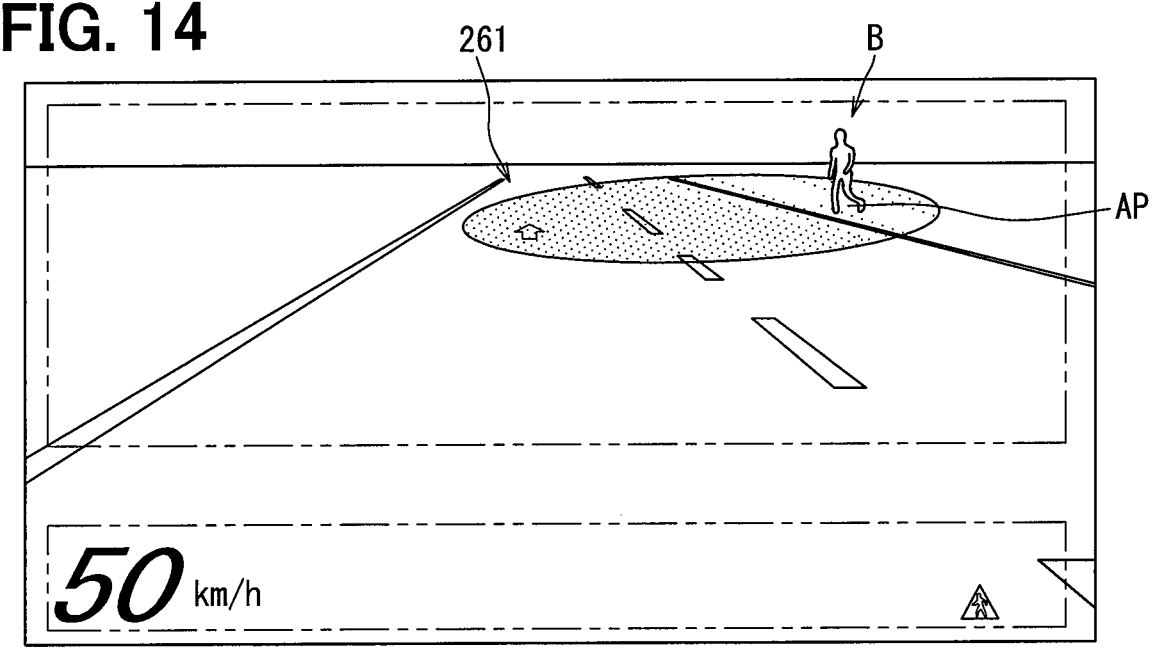
FIG. 14 is a view illustrating an example of a ripple image according to a second embodiment.
Figure 15:
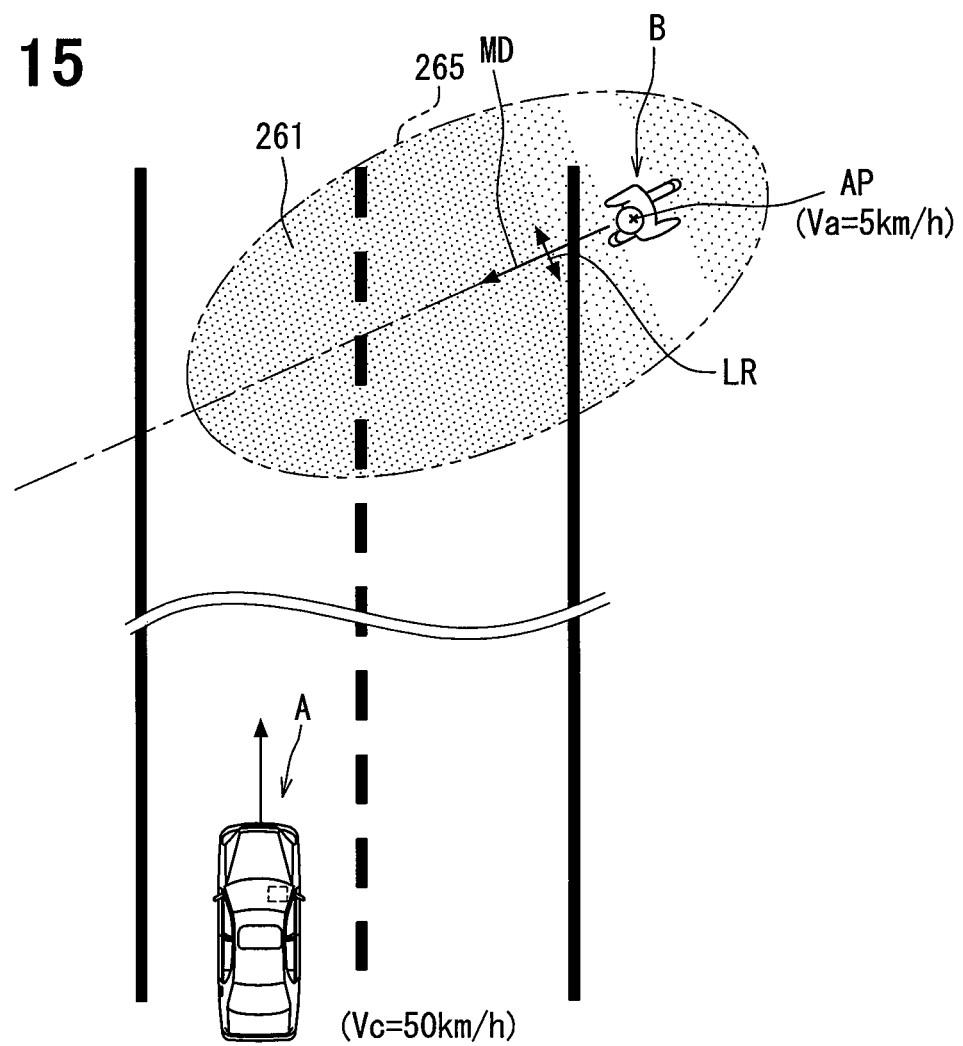
FIG. 15 is a view illustrating a concept of the ripple image shown in FIG. 14.

A ripple image 261 according to a second embodiment of the present disclosure as illustrated in FIGS. 14 and 15 is a modified example of the ripple image 61 of the first embodiment (see FIG. 4 and other figures). The ripple image 261 is an elliptical image extending along the road surface. A farther focus from the vehicle A in two focuses of the ripple image 261 is aligned with the position AP of the notification target B. The major axis of the ripple image 261 extends in the moving direction MD of the notification target B. The ripple image 261 shaped and positioned as described above extends in the moving direction MD of the notification target B from the position AP of the notification target B.

The ripple image 261 enlarges in the radial direction toward an outer edge 265 from the vicinity of the notification target B. The ripple image 261 having enlarged to the outer edge 265 temporarily disappears. Thereafter, the ripple image 261 again appears in the vicinity of the notification target B, and enlarges toward the outer edge 265. The ripple image 261 repeatedly displays animation changeable in the above-described manner to notify the driver about the presence of the notification target B.

The display of the ripple image 261 becomes less clear in the direction toward the position AP of the notification target B with gradation around the notification target B. In addition, the shape of the ripple image 261 changes in accordance with respective statuses of the notification target B and the vehicle A similarly to the first embodiment. More specifically, the size of the ripple image 261 increases in the moving direction MD and decreases in the width direction LR as the moving speed Va of the notification target B increases. In addition, the display cycle of the ripple image 261 that repeats expansion toward the outer edge 265 and disappearance shortens as the moving speed Va of the notification target B increases. Moreover, the size of the ripple image 261 increases as the traveling speed Vc of the vehicle A decreases.

According to the second embodiment described above, the ripple image 261 produces advantageous effects similar to those of the first embodiment to give the driver a sense of impending crisis. Accordingly, the driver more securely recognizes the presence of the notification target B.

Other Embodiments

It is not intended that the present disclosure to be interpreted should be limited to the multiple embodiments of the present disclosure described herein. The present disclosure is applicable to various embodiments and combinations thereof without departing from the scope of the present disclosure.

Figure 16:
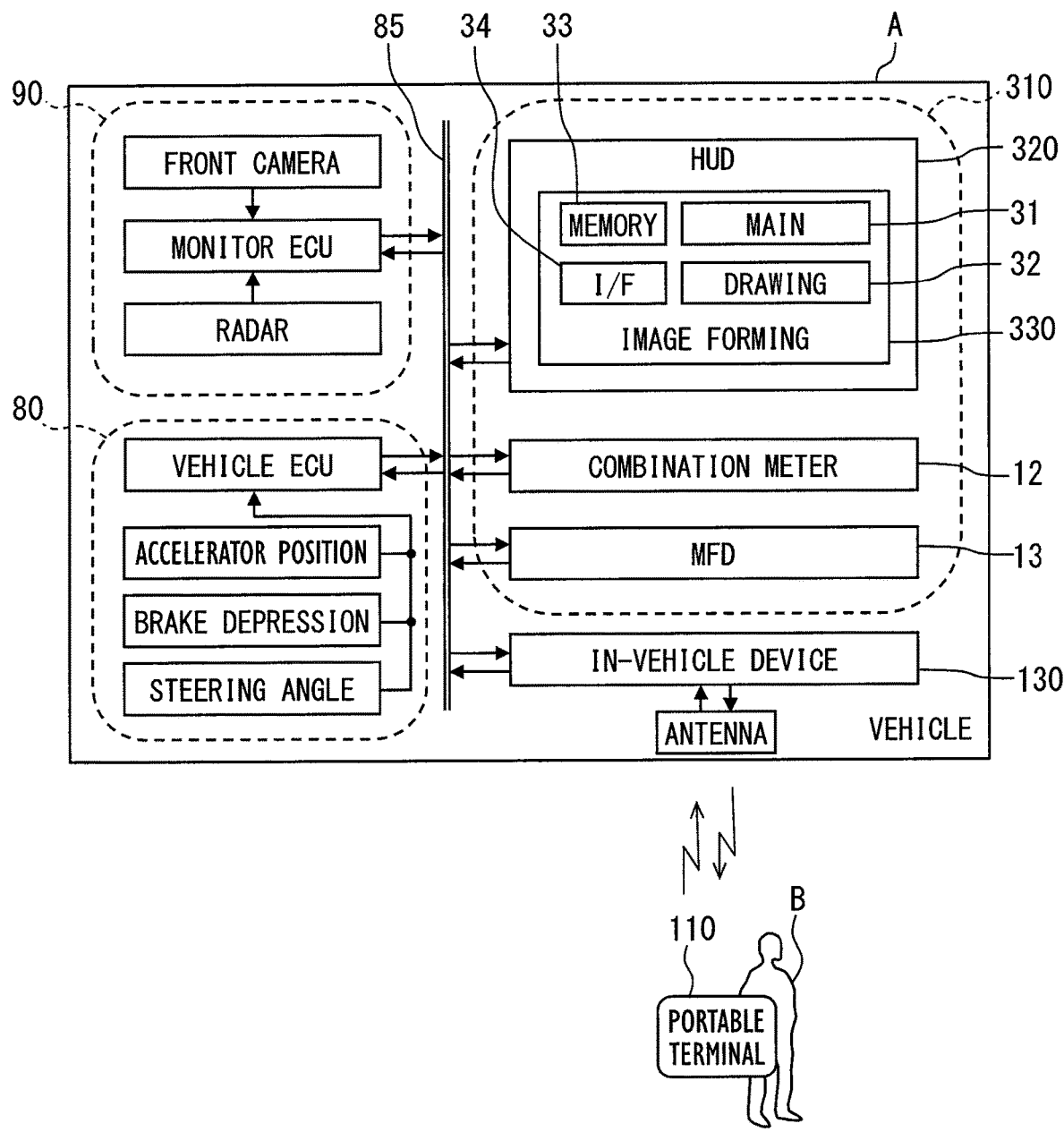
FIG. 16 is a block diagram showing a modified example of the vehicle onboard network shown in FIG. 2.

The functions performed by the respective processors 31 and 32 of the control circuit 30 in the above-described embodiments may be performed by hardware and software different from those described herein, or a combination of the different hardware and software. For example, a display system 310 according to a modified example shown in FIG. 16 does not include an HCU. An image projected by an HUD device 320 is formed by an image generation circuit 330 provided within the HUD device 320. Similarly, images displayed by the combination meter 12 and the multifunction display 13 are formed by image generation circuits each of which is provided within the corresponding configuration of the combination meter 12 or the multifunction display 13.

The image generation circuit 330 corresponds to the control circuit 30 according to the first embodiment (see FIG. 2), and includes the main processor 31, the drawing processor 32, the memory 33, the input/output interface 34 and others. The image generation circuit 330 obtains information output from the outside recognition system 90 and the vehicle control system 80 to the communication bus 85, and forms a ripple image. According to the modified example herein, the image generation circuit 330 corresponds to the image generation apparatus of the present disclosure.

Information on the notification target B in the above-described embodiments is detected by the outside sensors of the outside recognition system 90. However, information on the notification target B obtained by the HCU 100 (see FIG. 2) and the image generation circuit 330 is not limited to information detected by the outside recognition system 90. For example, information on notification target B received through pedestrian-to-vehicle communication may be obtained by the HCU 100 and the image generation circuit 330.

Pedestrian-to-vehicle communication is provided between an in-vehicle device 130 mounted on the vehicle A and a portable terminal 110 carried by a pedestrian or the like, for example. The portable terminal 110 and the in-vehicle device 130 transmit and receive information via wireless communication such as a wireless local area network (LAN) and Bluetooth (registered trademark). The in-vehicle device 130 obtains current position information from the portable terminal 110. The in-vehicle device 130 or the image generation circuit 330 compares the information on the current position of the vehicle A and information on the position of the portable terminal 110 to calculate a relative position of the pedestrian or the like carrying the portable terminal 110. According to the pedestrian-to-vehicle communication thus adopted, the HCU 100 (see FIG. 2) and the image generation circuit 330 are capable of obtaining information on the notification target B even when the pedestrian or the like is located out of detection ranges of the outside sensors. Information on the notification target B may be given to the vehicle A via road-to-vehicle communication as well as pedestrian-to-vehicle communication.

The ripple image 61 according to the above-described embodiments is formed on the first image generation surface 21*a* located before the windshield 18 by approximately 15 meters (see FIG. 3). However, the ripple image is not required to be formed on the first image generation surface. For example, the ripple image may be formed at a position before the windshield 18 by approximately 2 meters similarly to the icon. Moreover, the position of generation of the ripple image may be varied in a range from 2 meters to 15 meters, for example.

According to the above-described embodiments, the display mode of the ripple image is changed in accordance with the moving speed Va of the notification target B and the traveling speed Vc of the vehicle A. However, the display mode of the ripple image may be fixed regardless of the moving speed Va and the traveling speed Vc. In addition, a high visual attraction display mode of the ripple image may be maintained even at the time of input of an avoiding operation. Furthermore, display of the ripple image may be stopped at the time of input of an avoiding operation.

Each of the arc image parts according to the first embodiment described above has an elliptic arc shape enlarged in the radial direction with a shift toward the outer edge. However, each of the arc image parts may have an arc shape curved with constant curvature. Each of the arc image parts may be in such a display mode in which the arc image part shifts in the moving direction MD while maintaining the same shape. Each of the arc image parts may be divided into multiple parts in the circumferential direction.

The line width LW of each of the arc image parts may be decreased or increased in the direction approaching the outer edge of the ripple image. Size reduction of the ripple image in the width direction LR in accordance with increase in the moving speed Va may be realized by reduction of the central angle of each of the arc image parts.

Expansion of the ripple image in the moving direction MD is expressed by shifts of the arc image parts shifting from the position AP of the notification target B toward the outer edge according to the first embodiment. On the other hand, expansion of the ripple image in the moving direction MD is expressed by movement of expansion toward the outer edge according to the second embodiment. However, expansion in the moving direction MD may be expressed by a ripple image configured by a still image not having this type of animation. More specifically, expansion of the ripple image in the moving direction MD may be expressed by a change of luminance or light and shade in a color in the moving direction MD, i.e., by gradation.

According to the above-described embodiments, the ripple image is displayed in the display mode shifting on the road surface. However, the ripple image may be displayed in such a mode as shifting at a predetermined height from the road surface, for example. According to this display mode, the ripple image is superimposed and displayed on the road surface without a sense of incongruity even when the road surface in the vicinity of the notification target B has a step or inclination.

According to the above-described embodiments, a detection object whose moving direction MD crosses the traveling direction CD is selected as the notification target B. However, all detection objects detected in the traveling direction CD of the vehicle A may be selected as the notification targets B. When multiple notification targets B are present in a range of a predetermined distance, not the one notification target B located closest to the vehicle A, but the one notification target B moving toward the vehicle A at the highest moving speed Va may be selected as the notification target B.

According to the above-described embodiment, display of the ripple image is stopped when the traveling speed Vc exceeds the threshold. This upper limit threshold speed may be varied appropriately. Furthermore, a lower limit threshold speed may be set to stop display of the ripple image when the traveling speed Vc is lower than the lower limit threshold speed. Note that settings of these threshold speeds are not required.

According to the above-described embodiments, the threshold distance for starting display of the ripple image is adjusted in accordance with the traveling speed Vc. However, the threshold distance may be fixed to a certain distance. According to this configuration, display of the ripple image starts regardless of the traveling speed Vc when the distance D between the vehicle A and the cross position CP becomes shorter than the predetermined threshold distance.

According to the above-described embodiments, gradation is given to the display around the notification target in the ripple image to reduce conspicuity of position detection errors of the notification target B, for example. However, positional deviation between the notification target and the ripple image may be made unclear by controlling the shape or color of the ripple image rather than gradation. When the detection accuracy and the calculation speed of the notification target B are sufficiently high, the area around the notification target in the ripple image may be clearly displayed.

It is noted that a flowchart or the processing of the flowchart in the present application includes multiple steps (also referred to as sections), each of which is represented, for instance, as S101. Further, each step can be divided into several sub-steps while several steps can be combined into a single step.

While various embodiments, configurations, and aspects of the image generation apparatus according to the present disclosure have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

The invention claimed is:

1. An image generation apparatus that generates an image notifying an occupant of a vehicle about a pedestrian, and outputs a virtual image of the image to a head-up display device that displays the virtual image while superimposing the virtual image on a foreground of the vehicle, the image generation apparatus comprising:
a target information acquisition part that obtains, using a processor, positional information and a moving direction of the pedestrian located in a traveling direction of the vehicle;
an image generation part that
outputs, using a processor, a ripple image displayed by the head-up display device while superimposed on a road surface where the pedestrian is located, the ripple image enlarged in the moving direction from a position of the pedestrian along the road surface, in response to the target information acquisition part obtaining at least one positional information and the moving direction of the pedestrian crossing the traveling direction of the vehicle, and
does not output the ripple image in response to the target information acquisition part obtaining the at least one positional information and the moving direction of the pedestrian not crossing the traveling direction of the vehicle; and
a subject vehicle information acquisition part that obtains, using a processor, a traveling speed of the vehicle,
wherein:
the image generation part does not generate the ripple image in response to the traveling speed of the vehicle exceeding a predetermined threshold speed.

2. The image generation apparatus according to claim 1, wherein:
the target information acquisition part obtains a moving speed of the pedestrian; and
the image generation part increases a size of the ripple image as the moving speed of the pedestrian increases.

3. The image generation apparatus according to claim 1, wherein:
the ripple image includes arc image parts each of which is curved in an arc shape surrounding the pedestrian, the arc image parts being displayed while repeatedly generated in the moving direction from the position of the pedestrian.

4. The image generation apparatus according to claim 3, wherein:
the target information acquisition part obtains a moving speed of the pedestrian; and
the image generation part shortens a cycle of generation of the arc image parts as the moving speed of the pedestrian increases.

5. The image generation apparatus according to claim 3, wherein:
the image generation part draws the arc image parts such that a curvature of each of the arc image parts increases in a direction approaching a virtual line extending in the moving direction from the position of the pedestrian.

6. The image generation apparatus according to claim 1, wherein:
the target information acquisition part obtains a moving speed of the pedestrian; and
the image generation part reduces a size of the ripple image in a width direction crossing the moving direction as the moving speed of the pedestrian increases.

7. The image generation apparatus according to claim 1, further comprising:
a cross determination part that selects, using a processor, the pedestrian from objects located in the traveling direction of the vehicle, based on whether the moving direction crosses the traveling direction,
wherein:
the image generation part generates the ripple image notifying about the pedestrian selected by the cross determination part.

8. The image generation apparatus according to claim 1, further comprising:
an operation determination part that determines, using a processor, whether the occupant has input an avoiding operation for avoiding the pedestrian,
wherein:
the image generation part switches a mode of the ripple image to a mode of low visual attraction, based on determination by the operation determination part that the avoiding operation has been input.

9. The image generation apparatus according to claim 1, wherein:
the image generation part increases a size of the ripple image as the traveling speed of the vehicle decreases.

10. The image generation apparatus according to claim 1, wherein:
the image generation part starts generation of the ripple image at a longer distance between the pedestrian and the vehicle as the traveling speed of the vehicle increases.

11. The image generation apparatus according to claim 1, wherein:
the image generation part generates the ripple image notifying the occupant about one pedestrian located closest to the vehicle in a plurality of pedestrians positioned at a shorter distance from each other than a predetermined distance in response to the target information acquisition part obtaining a plurality of sets of the positional information on the plurality of the pedestrians.

12. The image generation apparatus according to claim 1, wherein:
the image generation part generates the ripple image that increases clearness in a direction away from the pedestrian.

13. The image generation apparatus according to claim 1, wherein:
the image generation part does not output the ripple image in response to the target information acquisition part obtaining the at least one positional information in a case where the target information acquisition part does not obtain the positional information and the traveling speed of the vehicle exceeds a predetermined threshold speed.

14. An image generation apparatus that generates an image notifying an occupant of a vehicle about a notification target located in a traveling direction of the vehicle, and outputs a virtual image of the image to a head-up display device that displays the virtual image while superimposing the virtual image on a foreground of the vehicle, the image generation apparatus comprising:
a target information acquisition part that obtains, using a processor, positional information and a moving direction of the notification target; and
an image generation part that generates, using a processor, a ripple image displayed by the head-up display device while superimposed on a road surface where the notification target is located, the ripple image enlarged in the moving direction from a position of the notification target along the road surface, in response to the target information acquisition part obtaining at least one positional information,
wherein:
the image generation part outputs the ripple image and an icon notifying presence of the notification target so as to display the icon after a predetermined period of time from which displaying of the ripple image is started.

15. The image generation apparatus according to claim 14, wherein:
a far display area and a near display area are defined as display areas on which the image is projected by the head-up display device, an image formation position of light for the near display area being closer to the occupant than an image formation position of light for the far display area; and the image generation part displays the ripple image on the far display area and the icon on the near display area.

16. The image generation apparatus according to claim 14, further comprising:
a subject vehicle information acquisition part that obtains a traveling speed of the vehicle.

17. The image generation apparatus according to claim 16, wherein:
the image generation part stops generation of the ripple image in response to the traveling speed of the vehicle exceeding a threshold speed specified beforehand.

18. An image generation apparatus that generates an image notifying an occupant of a vehicle about a pedestrian, and outputs a virtual image of the image to a head-up display device that displays the virtual image while superimposing the virtual image on a foreground of the vehicle, the image generation apparatus comprising:
a target information acquisition part that obtains, using a processor, positional information and a moving direction of the pedestrian located in a traveling direction of the vehicle;
an image display part that
performs, using a processor, superimposed display of a directional image indicative of the moving direction on the foreground, in response to the target information acquisition part obtaining at least one positional information and the moving direction of the pedestrian crossing the traveling direction of the vehicle, and
does not perform the superimposed display of the directional image in response to the target information acquisition part obtaining the at least one positional information and the moving direction of the pedestrian not crossing the traveling direction; and
a subject vehicle information acquisition part that obtains a traveling speed of the vehicle,
wherein:
the image display part does not display the directional image in response to the traveling speed of the vehicle exceeding a threshold speed that is determined to indicate whether the vehicle travels on a road where the pedestrian is unlikely to exist.

19. The image generation apparatus according to claim 18, wherein:
the image display part does not display the directional image in response to that the traveling speed of the vehicle goes below a lower limit threshold speed.

20. The image generation apparatus according to claim 18, wherein:
the image display part starts to display an icon notifying presence of the pedestrian after starting the display of the directional image.

21. The image generation apparatus according to claim 20, wherein:
a far display area and a near display area are defined as display areas on which the image is projected by the head-up display device, an image formation position of light for the near display area being closer to the occupant than an image formation position of light for the far display area; and
the image display part displays the directional image on the far display area and the icon on the near display area.

22. The image generation apparatus according to claim 18, wherein:
the image display part increases a size of the directional image as the traveling speed of the vehicle decreases.

23. The image generation apparatus according to claim 18, wherein:
the image display part starts to display the directional image in a state where the pedestrian is distant from the vehicle as the traveling speed of the vehicle increases.

24. The image generation apparatus according to claim 18, wherein:
the target information acquisition part obtains moving speed of the pedestrian; and
the image display part increases a size of the directional image as the moving speed increases.

25. The image generation apparatus according to claim 18, further comprising:
a cross determination part that selects the pedestrian from objects located in the traveling direction based on whether the moving direction crosses the traveling direction,
wherein:
the image display part displays the directional image notifying about the pedestrian selected by the cross determination part.

26. The image generation apparatus according to claim 18, further comprising:
an operation determination part that determines whether the occupant inputs an operation to avoid the pedestrian,
wherein:
the image display part switches a display mode of the directional image to a display mode of low visual attraction in accordance with determination by the operation determination part that the operation has been input.

27. The image generation apparatus according to claim 18, wherein:
the image display part displays the directional image notifying a pedestrian located closest to the vehicle in a plurality of pedestrians notification targets which are positioned at a shorter distance from each other than a predetermined distance in response to that the target information acquisition part obtains a plurality of sets of positional information on the pedestrians.

28. The image generation apparatus according to claim 18, wherein:
the image display part displays the directional image that increases clearness in a direction away from the pedestrian.

* * * * *